(12) United States Patent
Shouno

(10) Patent No.: US 8,817,785 B2
(45) Date of Patent: Aug. 26, 2014

(54) COMMUNICATION APPARATUS HAVING A PLURALITY OF NETWORK INTERFACES, METHOD OF COMMUNICATION BY THE COMMUNICATION APPARATUS, AND STORAGE MEDIUM

(71) Applicant: Canon Kabushiki Kaisha, Tokyo (JP)

(72) Inventor: Hiroki Shouno, Kawasaki (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/778,485

(22) Filed: Feb. 27, 2013

(65) Prior Publication Data

US 2013/0170491 A1 Jul. 4, 2013

Related U.S. Application Data

(63) Continuation of application No. 12/896,022, filed on Oct. 1, 2010, now Pat. No. 8,411,682.

(30) Foreign Application Priority Data

Oct. 2, 2009 (JP) ................. 2009-230594

(51) Int. Cl.
*H04L 12/28* (2006.01)
*H04L 12/56* (2006.01)
*H04L 12/18* (2006.01)

(52) U.S. Cl.
CPC .............. *H04L 12/18* (2013.01); *H04L 12/185* (2013.01); *H04L 45/16* (2013.01)
USPC ............................ 370/390; 370/389; 370/392

(58) Field of Classification Search
CPC ........ H04L 12/18; H04L 12/185; H04L 45/16
USPC ...................... 370/389–392; 455/452.1, 435.2
See application file for complete search history.

(56) References Cited

U.S. PATENT DOCUMENTS 6,535,489 B1 * 3/2003 Merchant et al. ............. 370/244
7,069,312 B2 6/2006 Kostic et al.

(Continued)

FOREIGN PATENT DOCUMENTS

| CN | 1716963 A | 1/2006 |
| JP | 2004-032076 A | 1/2004 |
| JP | 2006-121192 A | 5/2006 |

OTHER PUBLICATIONS

Shun Higashine, et al."An Implementation of Endhost Service Oriented Routing Architecture for Multiple Network Interfaces", The Institute of Electronics, Information and Communication Engineers Technical Report, vol. 106, No. 41, p. 53-56, dated May 11, 2006.

(Continued)

*Primary Examiner* — Chuong T Ho
(74) *Attorney, Agent, or Firm* — Rossi, Kimms & McDowell LLP

(57) ABSTRACT

A communication apparatus which is capable of performing multicasting or broadcasting using a user-desired network interface. An MFP implementing the communication apparatus includes a plurality of network interfaces and performs multicasting or broadcasting via at least one of the network interfaces. A controller unit provides an application programming interface to an application that operates on the MFP. An operator of the MFP operates an operation unit to set a transmission condition for transmitting a multicast packet and a broadcast packet via a predetermined network interface. When a plurality of active network interfaces are detected, one of the plurality of detected active network interfaces which satisfies the set transmission condition is selected and multicasting or broadcasting is performed via the selected network interface.

5 Claims, 13 Drawing Sheets

(56) References Cited

U.S. PATENT DOCUMENTS

| | | |
|---|---|---|
| 7,339,929 B2 | 3/2008 | Zelig et al. |
| 7,751,394 B2 | 7/2010 | Takihiro et al. |
| 7,957,738 B2 | 6/2011 | Rey et al. |
| 8,032,658 B2* | 10/2011 | Tripathi ............... 709/250 |
| 8,180,899 B2* | 5/2012 | Lioy et al. ............. 709/227 |
| 2006/0047856 A1* | 3/2006 | Tripathi ............... 709/250 |
| 2006/0104292 A1 | 5/2006 | Gupta et al. |
| 2008/0095160 A1* | 4/2008 | Yadav et al. .......... 370/390 |
| 2008/0293428 A1 | 11/2008 | Rey et al. |
| 2009/0296713 A1 | 12/2009 | Kompella |
| 2012/0023189 A1* | 1/2012 | Giaretta et al. ....... 709/217 |

OTHER PUBLICATIONS

Japanese Office Action for corresponding JP 2009-230594, dated Aug. 20, 2013.

CN OA issued Dec. 27, 2012 for corresponding CN 201010503836 (Cited in parent US 2011-0080910).

* cited by examiner

FIG.5

```
SLP: ----- SLP Header -----
    SLP:
    SLP: Version         = 2
    SLP: Function        = 1 (Service Request)
    SLP: Packet length   = 0, DOES NOT EQUAL ACTUAL 51
    SLP: Flow control    = 33
    SLP:         0... .... = Overflow
    SLP:         .0.. .... = User Agent Multilingual
    SLP:         ..1. .... = URL Authentication Block follows
    SLP:         ...1 .... = Attribute Authentication follows
    SLP:         .... 0... = Service is update
    SLP:         .... .0.. = reserved
    SLP:         .... ..1. = reserved
    SLP:         .... ...1 = reserved
    SLP: Dialect          = 20
    SLP: Language Code    = 0
```

FIG. 6

```
DLC: ----- DLC Header -----
    DLC:
    DLC: Frame 327 arrived at 17:08:43.5783; frame size is 93(005D hex) bytes.
    DLC: Destination = Multicast 01005E7FFFFD
    DLC: Source      = Station 000085ADBAE9
    DLC: Ethertype = 0800 (IP)
    DLC:
IP: ----- IP Header -----
    IP:
    IP: Version = 4, header length = 20 bytes
    IP: Type of service = 00
    IP:     000. .... = routine
    IP:     ...0 .... = normal delay
    IP:     .... 0... = normal throughput
    IP:     .... .0.. = normal reliability
    IP:     .... ..0. = ECT bit - transport protocol will ignore the CE bit
    IP:     .... ...0 = CE bit - no congestion
    IP: Total length  = 79 bytes
    IP: Identification = 0
    IP: Flags         = 4X
    IP:     .1.. .... = don' t fragment
    IP:     ..0. .... = last fragment
    IP: Fragment offset = 0 bytes
    IP: Time to live  = 1 seconds/hops
    IP: Protocol      = 17(UDP)
    IP: Header checksum = 2D2B (correct)
    IP: Source address    = [172.24.176.93]
    IP: Destination address = [239.255.255.253]
    IP: No options
    IP:
UDP: ----- UDP Header -----
    UDP:
    UDP: Source port  = 32784
    UDP: Destination port = 427 (SLP)
    UDP: Length       = 59
    UDP: Checksum     = 4AA3 (correct)
    UDP: [51 byte(s) of data]
    UDP:
SLP: ----- SLP Header -----
    SLP:
    SLP: Version          = 2
    SLP: Function         = 1 (Service Request)
    SLP: Packet length = 0, DOES NOT EQUAL ACTUAL 51
    SLP: Flow control     = 33
    SLP:    0... .... = Overflow
    SLP:    .0.. .... = User Agent Multilingual
    SLP:    ..1. .... = URL Authentication Block follows
    SLP:    ...1 .... = Attribute Authentication follows
    SLP:    .... 0... = Service is update
    SLP:    .... .0.. = reserved
    SLP:    .... ..1. = reserved
    SLP:    .... ...1 = reserved
    SLP: Dialect       = 20
    SLP: Language Code = 0
    SLP: Char Encoding = 0
    SLP: XID           = 57
    SLP:
    SLP: Prev resp list str len = 2
    SLP: Length of predicate string =25966
```

FIG. 7

```
DLC:  ----- DLC Header -----
     DLC:
     DLC: Frame 72 arrived at 18:33:09.9037; frame size is 93(005D hex) bytes.
     DLC: Destination = Multicast 01005E7FFFFD
     DLC: Source      = Station 00065B871109
     DLC: Ethertype = 0800 (IP)
     DLC:
IP:  ----- IP Header -----
     IP:
     IP: Version = 4, header length = 20 bytes
     IP: Type of service = 00
     IP:      000. .... = routine
     IP:      ...0 .... = normal delay
     IP:      .... 0... = normal throughput
     IP:      .... .0.. = normal reliability
     IP:      .... ..0. = ECT bit - transport protocol will ignore the CE bit
     IP:      .... ...0 = CE bit - no congestion
     IP: Total length  = 79 bytes
     IP: Identification = 0
     IP: Flags         = 4X
     IP:      .1.. .... = don' t fragment
     IP:      ..0. .... = last fragment
     IP: Fragment offset = 0 bytes
     IP: Time to live   = 1 seconds/hops
     IP: Protocol       = 17(UDP)
     IP: Header checksum = 189B (correct)
     IP: Source address    = [192.168.176.93]
     IP: Destination address = [239.255.255.253]
     IP: No options
     IP:
UDP: ----- UDP Header -----
     UDP:
     UDP: Source port    = 32784
     UDP: Destination port = 427 (SLP)
     UDP: Length         = 59
     UDP: Checksum       = 3613 (correct)
     UDP: [51 byte(s) of data]
     UDP:
SLP: ----- SLP Header -----
     SLP:
     SLP: Version       = 2
     SLP: Function      = 1 (Service Request)
     SLP: Packet length = 0, DOES NOT EQUAL ACTUAL 51
     SLP: Flow control  = 33
     SLP:     0... .... = Overflow
     SLP:     .0.. .... = User Agent Multilingual
     SLP:     ..1. .... = URL Authentication Block follows
     SLP:     ...1 .... = Attribute Authentication follows
     SLP:     .... 0... = Service is update
     SLP:     .... .0.. = reserved
     SLP:     .... ..1. = reserved
     SLP:     .... ...1 = reserved
     SLP: Dialect       = 20
     SLP: Language Code = 0
     SLP: Char Encoding = 0
     SLP: XID           = 57
     SLP:
     SLP: Prev resp list str len = 2
     SLP: Length of predicate string =25966
```

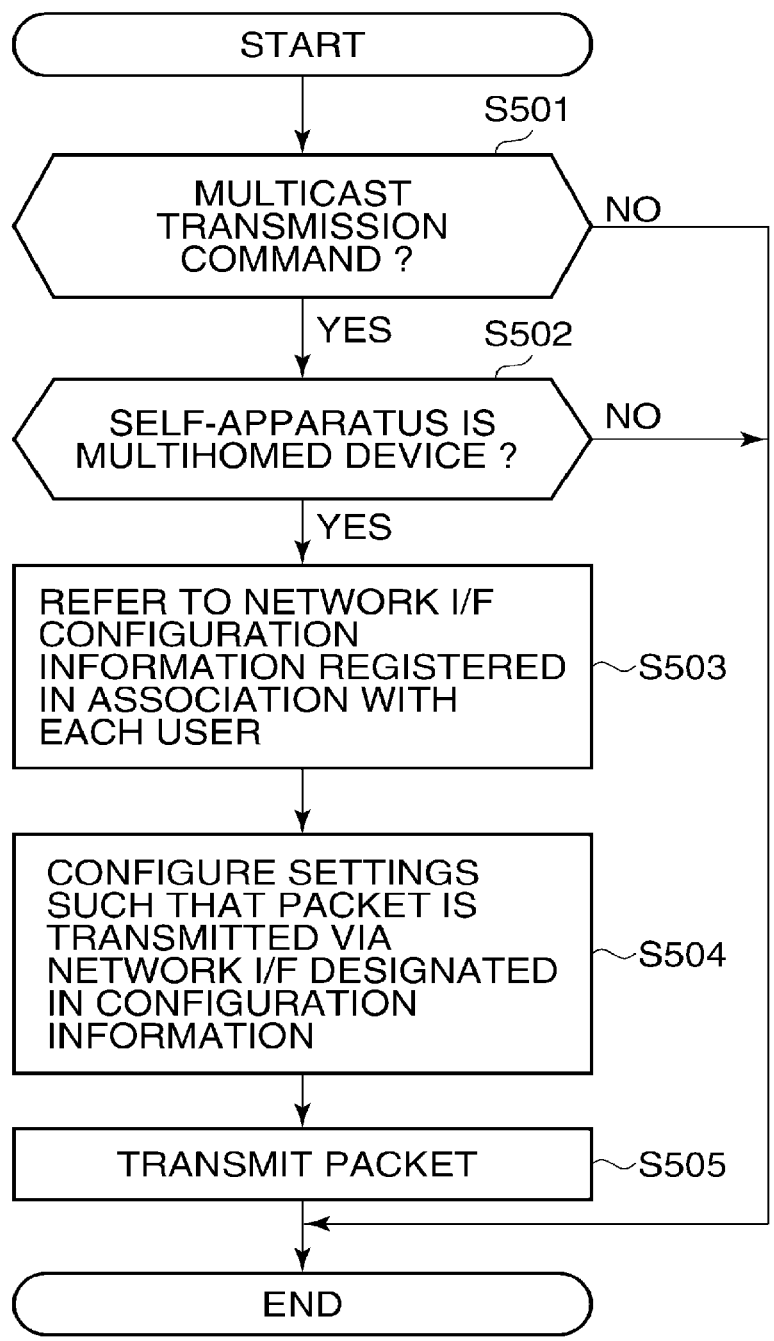

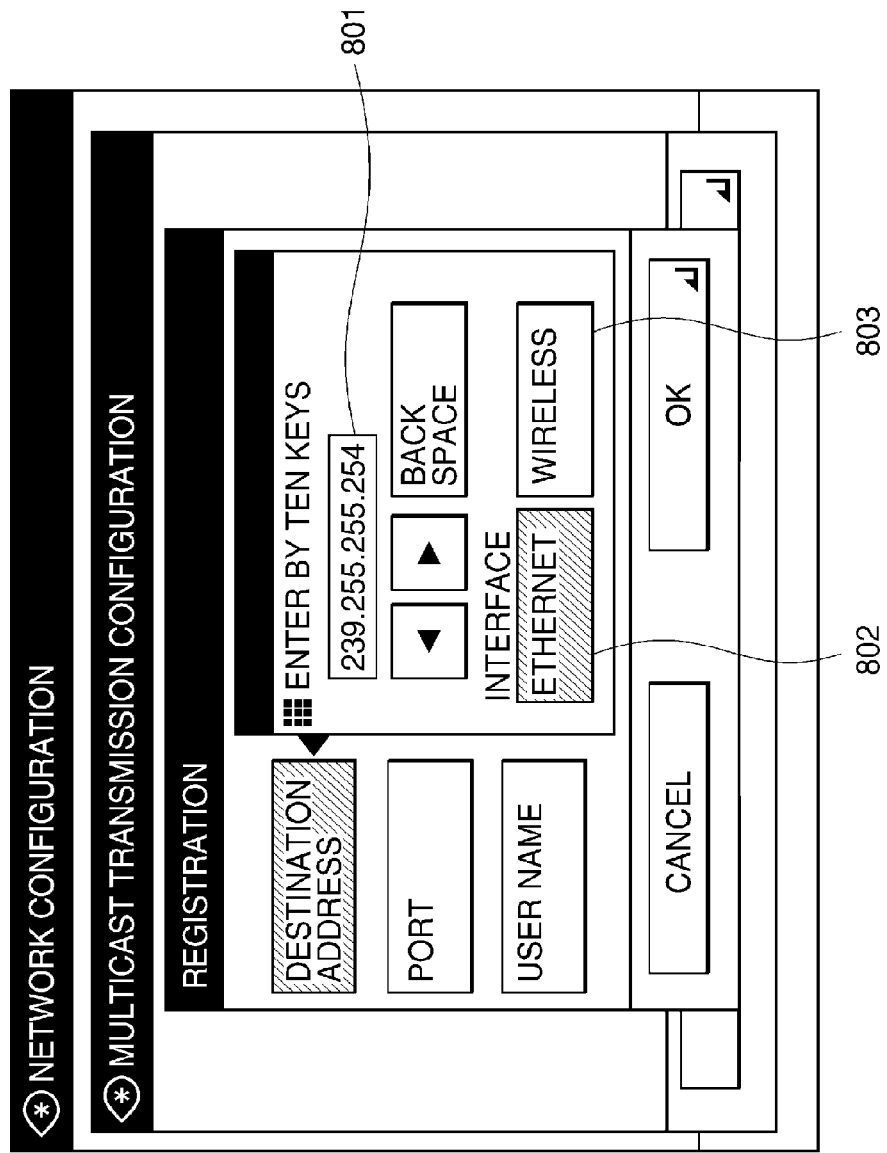

COMMUNICATION APPARATUS HAVING A PLURALITY OF NETWORK INTERFACES, METHOD OF COMMUNICATION BY THE COMMUNICATION APPARATUS, AND STORAGE MEDIUM

BACKGROUND OF THE INVENTION

1. Field of the Invention

The present invention relates to a communication apparatus and a method of communication by the communication apparatus, as well as to a storage medium storing a program for implementing the method, and more particularly to a technique for constructing a platform which makes it possible for a communication apparatus having a plurality of network interfaces to operate without requiring an application operating in an upper layer to be conscious of the number of the network interfaces.

2. Description of the Related Art

Conventionally, a method called multicast or broadcast is generally employed when an application operating in a multifunction peripheral or a printer searches for another multifunction peripheral or printer, a personal computer, a server, etc. on a TCP/IP network.

Multicast is a method of simultaneously transmitting data to a plurality of nodes on a network. This method makes it possible to transmit the same data to nodes belonging to a specific group called a multicast group. In a search performed using multicast, a device (a printer, a multifunction peripheral, etc.) as a search target which is searched for belongs to a predetermined multicast group, and a device which performs the search sends out a multicast packet addressed to the multicast group. Upon receipt of the multicast packet, the device as the search target sends a response packet to the sender, using unicast. The sender, i.e. the device which performs the search refers to address information and name information on a node contained in the response packet, to thereby identify the node. In general, a device search using multicast is performed in the above-described procedure. It should be noted that above-mentioned unicast is a method in which a single node is designated as a destination.

On the other hand, broadcast is a technique of simultaneously transmitting a packet to an unspecified number of nodes on a network. In a search performed using broadcast, a device which performs the search transmits a broadcast packet. When receiving the broadcast packet, a device as a search target sends a response packet to the sender, using unicast. The sender, i.e. the device which performs the search refers to address information and name information on a node contained in the response packet, to thereby identify the node. In general, a device search using broadcast is performed in the above-described procedure.

Recently, in developing software which operates on a multifunction peripheral or a printer, there has been an increasing tendency to improve development efficiency by using a source code that is common for different platforms and device models. This is useful for developing software in a shorter time period in recent product planning in which it is general to develop a plurality of models in parallel at the same time. More specifically, by using a common source code as much as possible between models different in hardware configuration or optional equipment, it is possible to reduce the number of software development steps to thereby develop a product in a shorter time period and at lower costs.

As a technique of sharing the source code of an application program between such products, a method of installing a Java (registered trademark) platform in a printer, a multifunction peripheral or the like is coming into widespread use. Java (registered trademark) software operates without being dependent on a specific OS (Operating System) or a CPU (Central Processing Unit). Therefore, an application developer is required to create a single application using Java (registered trademark) whereby it is possible to support all products on which the Java (registered trademark) platform is installed.

Further, in recent printers and multifunction peripherals, there have been an increasing number of models having a plurality of network interfaces as standard equipment or optional equipment. In one example of configuration, a model has an Ethernet (registered trademark) interface as standard equipment and a wireless LAN (Local Area Network) interface as optional equipment. These network interfaces can be used at the same time. A system configuration enabling the simultaneous use of multiple network interfaces is called "multihoming", and it is employed not only in a printer or a multifunction peripheral. It should be noted that the number of multiple network interfaces is not limited to two. Although not general, a device which is capable of operating three or more network interfaces at the same time is also considered to be multihomed. For example, there has been proposed a technique of configuring a multihomed device such that a packet received via one network interface is transferred to another network interface depending on specific conditions (see e.g. Japanese Patent Laid-Open Publication No. 2004-32076).

However, in a case where an application for performing multicast or broadcast transmission is operated on a multihomed device having the above-described system configuration of multihoming, there occur problems described below. For example, if a program code for executing multicast or broadcast transmission is described using a standard code using the C language as a general program language or Java (registered trademark), it usually can send packets to a single interface alone. In general, in a case where an application that operates on a multihomed device transmits a multicast or broadcast packet so as to search for a device on a network, it is envisaged as a basic operation to transmit the packet from all network interfaces of the device.

Further, when an application developed using the C language or Java (registered trademark) mentioned above is operated on a multihomed device, a packet is delivered to only one of multiple network interfaces, and hence it sometimes occurs that only nodes connected to the network interface can be searched. In such a case, if it is attempted to cause a multicast or broadcast packet to be delivered to all the network interfaces constituting the multihome, it is required to write a dedicated program code. For example, to cause a multicast packet to be delivered to a plurality of network interfaces by a program code written using the C language, it is required to describe a sequence of processes for designating IP_MULTICAST_IF as the fourth argument of setsockopt( ) and designating the interfaces to which the multicast packet is to be sent. As described above, in order to develop an application that delivers a multicast or broadcast packet to all network interfaces on a multihomed device, it is required to incorporate a dedicated code in the application.

On the other hand, an application developed for a conventional device provided with a single network interface does not incorporate a dedicated code for performing multicast or broadcast transmission in a multihome environment, which makes it impossible to make the code common between different devices. Particularly in the case of a Java (registered trademark) application for recent multifunction peripherals, specifications of the Java (registered trademark) platform of each multifunction peripheral is disclosed, and application development is being executed based on the premise of the use of a Java application in the multifunction peripheral. In such a case, it can be envisaged to use an application originally developed assuming the use of a single network interface also in a multihomed device, which brings about a significant problem.

Further, in Japanese Patent Laid-Open Publication No. 2004-32076 mentioned above, there has been proposed a method of controlling a plurality of network interfaces, including transferring a packet received via one network interface to another network interface, on a multihomed device. In addition, for a general route, a technique has conventionally been proposed in which a packet received via one network interface is transferred to another single interface or other network interfaces. However, these techniques perform control by software coded specifically for a device having a particular device configuration, and hence are not suitable for the use of an application being operated on a plurality of hardware devices having various different device configurations.

Further, there is a need for controlling interfaces via which a multicast or broadcast packet is to be transmitted, from the viewpoint of security and userfriendliness. For example, a user who logs in to a multifunction peripheral may be a guest user or a highly authorized user, and hence there is sometimes a case where an accessible network is desired to be limited according to user's rights. Now, let it be assumed that one network interface of a multihomed device is connected to a first LAN accessible by a guest user, and the other network interface of the same is connected to a second LAN with high confidentiality. In this case, it is preferred that when a guest user accesses the network by operating the multifunction peripheral, the multifunction peripheral can only connect to the first LAN alone, whereas when a highly authorized user operates the multifunction peripheral, the multifunction peripheral can connect to both the first LAN and the second LAN. In other words, besides the problem that multicast or broadcast transmission cannot be performed via all the network interfaces of the multihomed device, there is also a problem unless a network interface via which a packet is to be transmitted cannot be controlled, it is undesirable from the viewpoint of security and userfriendliness.

SUMMARY OF THE INVENTION

The present invention provides a communication apparatus which is configured as a multihomed device and is capable of performing multicasting or broadcasting using a user-desired network interface, without developing an application incorporating a dedicated code.

In a first aspect of the present invention, there is provided a communication apparatus including a plurality of network interfaces and a communication unit for performing multicasting or broadcasting via at least one of the network interfaces, comprising a control unit configured to provide an application programming interface to an application that operates on the communication apparatus, a detection unit configured to detect any active network interface among the plurality of network interfaces, and a setting unit configured to set a transmission condition for transmitting a multicast packet and a broadcast packet via a predetermined network interface, wherein when the detection unit detects a plurality of active network interfaces, the communication unit selects one of the plurality of detected active network interfaces which satisfies the transmission condition set by the setting unit, and performs multicasting or broadcasting via the selected network interface, in response to the control unit receiving a multicast or broadcast transmission request from the application.

In a second aspect of the present invention, there is provided a communication apparatus including a plurality of network interfaces and a communication unit for performing multicasting or broadcasting via at least one of the network interfaces, comprising a control unit configured to provide an application programming interface to an application that operates on the communication apparatus, and a detection unit configured to detect any active network interface among the plurality of network interfaces, wherein when the detection unit detects a plurality of active network interfaces, the communication unit performs multicasting or broadcasting via the plurality of active network interfaces detected by the detection unit, in response to the control unit receiving a multicast or broadcast transmission request from the application.

In a third aspect of the present invention, there is provided a method of communication by a communication apparatus that includes a plurality of network interfaces and performs multicasting or broadcasting via at least one of the network interfaces, comprising providing an application programming interface to an application that operates on the communication apparatus, detecting any active network interface among the plurality of network interfaces, setting a transmission condition for transmitting a multicast packet and a broadcast packet via a predetermined network interface, selecting, when a plurality of active network interfaces are detected, one of the plurality of detected active network interfaces which satisfies the set transmission condition, and performing multicasting or broadcasting via the selected network interface, in response to receiving a multicast or broadcast transmission request from the application.

In a fourth aspect of the present invention, there is provided a method of communication by a communication apparatus that includes a plurality of network interfaces and performs multicasting or broadcasting via at least one of the network interfaces, comprising providing an application programming interface to an application that operates on the communication apparatus, detecting any active network interface among the plurality of network interfaces, and performing, when a plurality of active network interfaces are detected, multicasting or broadcasting via the plurality of detected active network interfaces, in response to receiving a multicast or broadcast transmission request from the application.

In a fifth aspect of the present invention, there is provided a non-transitory computer-readable storage medium storing a computer-executable program for causing a computer to execute a method of communication by a communication apparatus that includes a plurality of network interfaces and performs multicasting or broadcasting via at least one of the network interfaces, wherein the method comprises providing an application programming interface to an application that operates on the communication apparatus, detecting an active network interface among the plurality of network interfaces, setting a transmission condition for transmitting a multicast packet and a broadcast packet via a predetermined network interface, selecting, when a plurality of active network interfaces are detected, one of the plurality of detected active network interfaces which satisfies the set transmission condition, and performing multicasting or broadcasting via the selected network interface, in response to receiving a multicast or broadcast transmission request from the application.

In a sixth aspect of the present invention, there is provided a non-transitory computer-readable storage medium storing a computer-executable program for causing a computer to execute a method of communication by a communication apparatus that includes a plurality of network interfaces and performs multicasting or broadcasting via at least one of the network interfaces, wherein the method comprises providing an application programming interface to an application that operates on the communication apparatus, detecting an active network interface among the plurality of network interfaces, and performing, when a plurality of active network interfaces are detected, multicasting or broadcasting via the plurality of detected active network interfaces, in response to receiving a multicast or broadcast transmission request from the application.

According to the present invention, the communication apparatus as a multihomed device is capable of performing multicasting or broadcasting using a user-desired network interface, without developing an application incorporating a dedicated code.

Further features of the present invention will become apparent from the following description of exemplary embodiments (with reference to the attached drawings).

BRIEF DESCRIPTION OF THE DRAWINGS

FIG. 5 illustrates an example of data transmitted by an NW-APP or a Java (registered trademark)-APP within the MFP.

FIG. 6 illustrates a multicast packet transmitted via a network interface-A and a network interface-B.

FIG. 7 illustrates another multicast packet transmitted via the network interface-A and the network interface-B.

FIG. 9 is a flowchart of a network interface-configuring process executed by the MFP depending on a user logged in, for multicast transmission.

FIG. 10 is a view of an example of a configuration screen displayed on an operation unit of an MFP which is an image forming apparatus as a communication apparatus according to a second embodiment of the present invention, for associating an IP address as a destination of a multicast packet to be transmitted from the MFP and a network interface via which the packet is to be transmitted.

DETAILED DESCRIPTION OF THE EMBODIMENTS

The present invention will now be described in detail below with reference to the accompanying drawings showing embodiments thereof.

Figure 1:
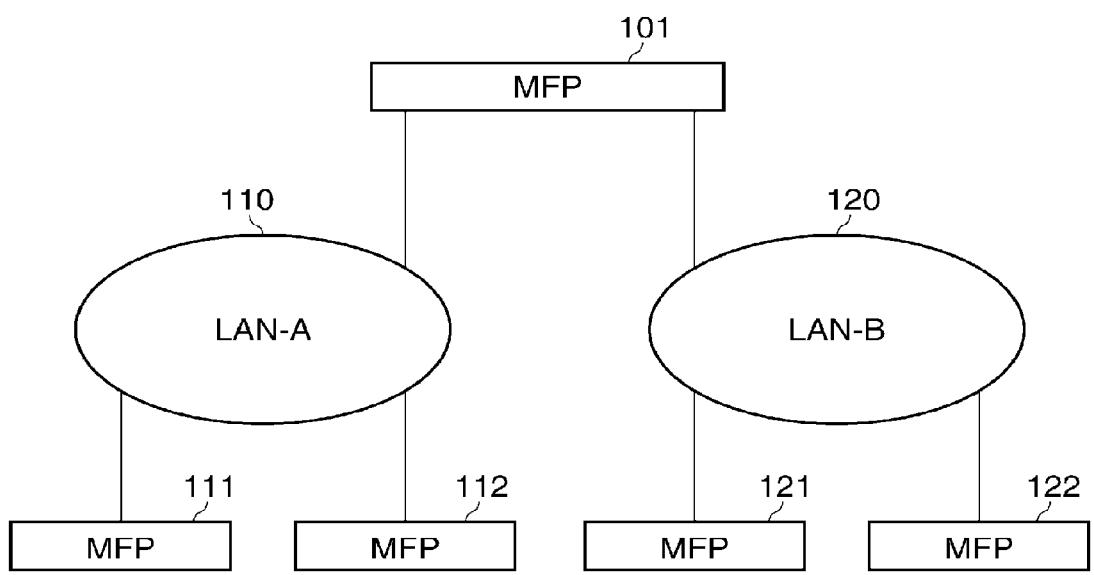
FIG. 1 is a diagram showing a network environment where an MFP which is an image forming apparatus as a communication apparatus according to a first embodiment of the present invention is connected.

FIG. 1 is a diagram showing an example of a network environment where an MFP (Multi-Function Peripheral) which is an image forming apparatus as a communication apparatus according to a first embodiment of the present invention is connected.

Referring to FIG. 1, reference numeral 101 denotes the above-mentioned MFP provided with two network interfaces. One of the two network interfaces is connected to a LAN (Local Area Network)-A 110, and the other is connected to a LAN-B 120. It is assumed that each of the LAN-A 110 and the LAN-B 120 is implemented by an Ethernet (registered trademark).

Connected to the LAN-A 110 are an MFP 111 and an MFP 112, such that the MFPs 111 and 112 can communicate with the MFP 101 using an IP protocol. It should be noted that no router exists between the MFP 101 and the MFPs 111 and 112. More specifically, the network is configured such that a broadcast packet or a multicast packet from the MFP 101 can reach the MFPs 111 and 112.

Connected to the LAN-B 120 are an MFP 121 and an MFP 122, such that the MFPs 121 and 122 can communicate with the MFP 101 using an IP protocol. It should be noted that no router exists between the MFP 101 and the MFPs 121 and 122. More specifically, the network is configured such that a broadcast packet or a multicast packet from the MFP 101 can reach the MFPs 121 and 122.

Figure 2:
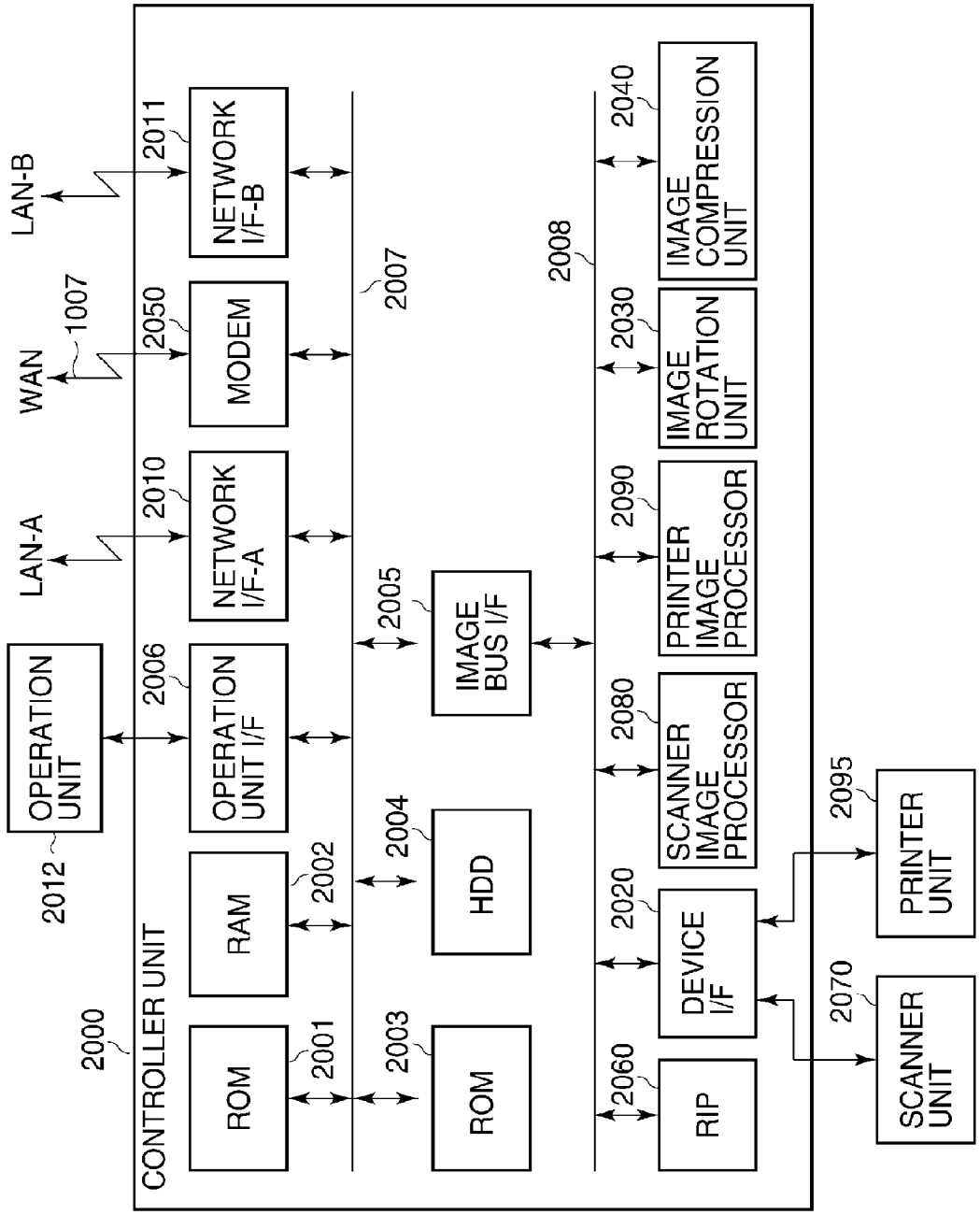
FIG. 2 is a schematic block diagram of essential parts of the MFP appearing in FIG. 1.

FIG. 2 is a schematic block diagram of essential parts of the MFP 101 appearing in FIG. 1.

A controller unit 2000 controls the overall operation of the MFP 101. The controller unit 2000 is connected to a scanner unit 2070 that reads an image and a printer unit 2095 that prints an image, and performs control for realizing a copy function of causing the printer unit 2095 to print out image data read by the scanner unit 2070.

Further, the controller unit 2000 is provided with component elements described below. A CPU (Central Processing Unit) 2001 starts up an operation system (OS) by a boot program stored in a ROM (Read Only Memory) 2003, and executes application programs (hereinafter abbreviated as "applications") stored in an HDD (Hard Disk Drive) 2004 on the OS to thereby carry out various operations. A RAM (Random Access Memory) 2002 is used as a work area for the CPU 2001. The RAM 2002 is also used as an image memory for temporarily storing image data.

The HDD 2004 stores not only the above-mentioned applications, but also image data. Connected to the CPU 2001 via a system bus 2007 are an operation unit interface (I/F) 2006, a network interface-A 2010, a network interface-B 2011, a modem 2050, and an image bus interface 2005.

The operation unit interface 2006 provides interface for communication with an operation unit 2012 having a touch panel, and image data to be displayed on the operation unit 2012 is output to the operation unit 2012 via the operation unit interface 2006. Further, the operation unit interface 2006 transfers information input by a user via the operation unit 2012 to the CPU 2001.

The network interface-A 2010, which is formed by integrating an network interface card (NIC) into an ASIC (Application Specific Integrated Circuit), is connected to the LAN-A 110. Similarly, the network interface-B 2011 is formed by integrating an NIC into an ASIC, and is connected to the LAN-B 120. It is assumed that the network interface-A 2010 is implemented by an Ethernet (registered trademark), while the network interface-B 2011 is a wireless LAN.

The modem 2050 is connected to a public communication line (WAN: Wide Area Network) 1007 to transmit and receive information via the WAN 1007.

The image bus interface 2005 is a bus bridge that connects the system bus 2007 with an image bus 2008 that is for use in high-speed transfer of image data, and performs conversion of data format. The image bus 2008 is implemented by a PCI bus or an IEEE 1394. On the image bus 2008, there are provided a raster image processor (RIP) 2060, a device interface 2020, a scanner image processor 2080, a printer image processor 2090, an image rotation unit 2030, and an image compression unit 2040.

The RIP 2060 is a processor that rasterizes PDL code into a bitmap image. The device interface 2020 is connected to the scanner unit 2070 and the printer unit 2095, and performs synchronous-to-asynchronous or asynchronous-to-synchronous conversion of image data. The scanner image processor 2080 corrects, manipulates, and edits input image data. The printer image processor 2090 performs correction, resolution conversion, etc. of image data to be printed out, such that the image data conforms to a printer. The image rotation unit 2030 rotates image data. The image compression unit 2040 compresses multi-valued image data into JPEG data, and binary image data into JBIG, MMR, or MH-formatted data, as well as performs expansion of the compressed data.

Figure 3:
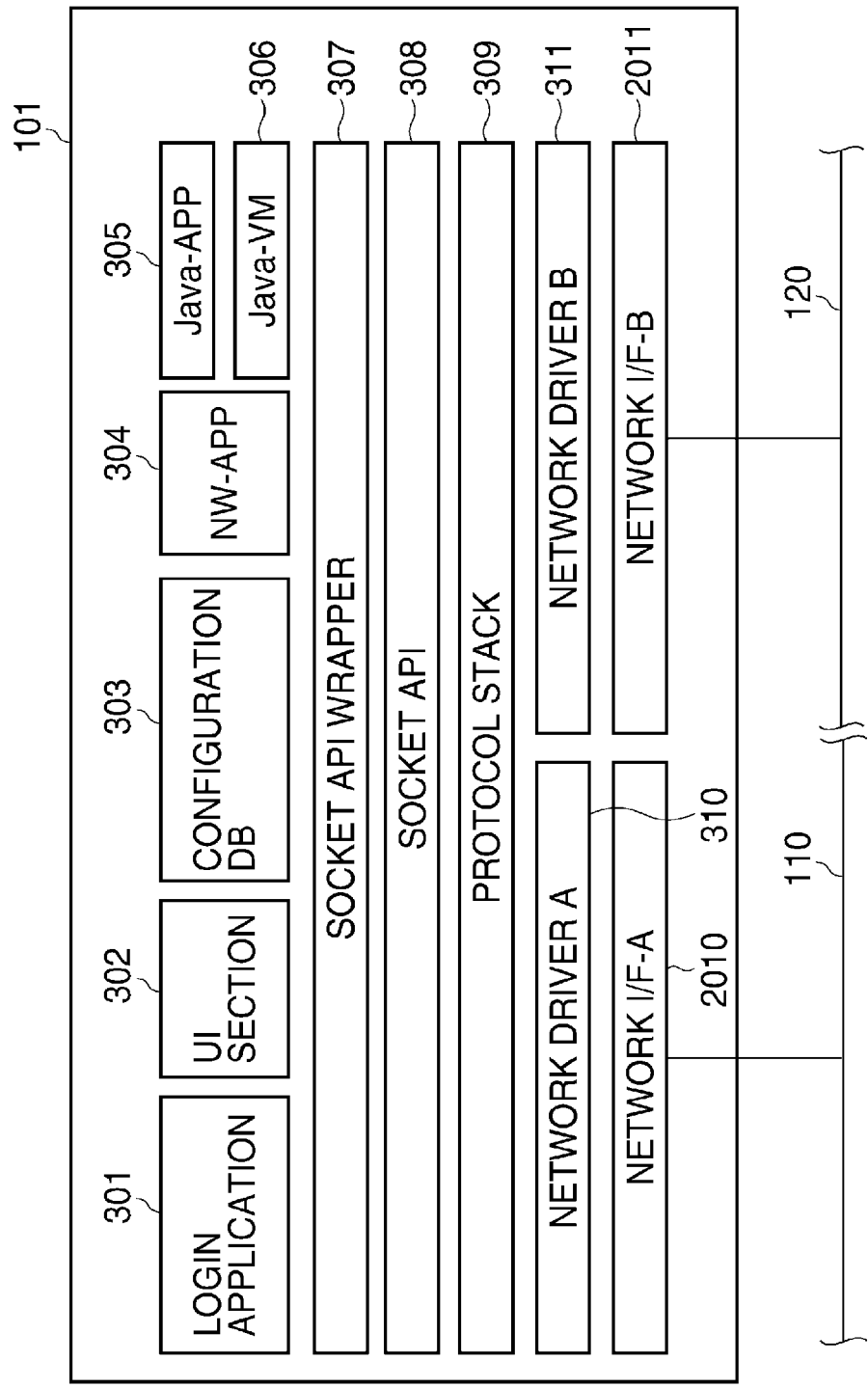
FIG. 3 is a block diagram showing software configuration of the communication function of the MFP.

FIG. 3 is a block diagram showing software configuration of the communication function of the MFP 101. It should be noted that FIG. 3 shows only essential parts related to the present invention, and the essential parts partially include hardware.

A login application 301 authenticates an operator (user) of the MFP 101 and performs login processing. A UI (User Interface) section 302 is an application for causing the MFP 101 to display a UI (User Interface) screen. A bitmap image generated by the UI section 302 is displayed on the operation unit 2012 via the operation unit interface 2006.

A configuration DB 303 is a database (DB) storing various kinds of configuration information on the MFP 101. The various kinds of configuration information include an IP address of the MFP 101 set e.g. by the user via the operation unit 2012 and user rights information to be referred to by the login application 301.

An NW-APP 304 is an application group of applications that operate on the MFP 101, using a network. The NW-APP 304 includes an application that receives a print job via a network, such as an LPD (Line Printer Daemon) or an IPP (Internet Printing Protocol). Further, the NW-APP 304 includes software programs, such as an SNMP (Simple Network Management Protocol) program and an SLP (Service Location Protocol) program, which provide functions of device management, service search, and so forth. Furthermore, software that provides a function of searching for a device on a network is also included in the NW-APP 304. This software is used so as to search for a device or a service on the network using a protocol, such as the SNMP or the SLP, to thereby cause the present MFP to function in cooperation with found device.

A Java (registered trademark)-APP 305 is an application group of applications written in Java (registered trademark). Similarly to the NW-APP 304, the Java (registered trademark)-APP 305 is developed to use the network function of the MFP 101, and performs device search using broadcasting or multicasting. A Java (registered trademark)-VM (Java Virtual Machine) 306 is provided to operate the Java (registered trademark)-APP 305. A socket API wrapper 307 is a wrapper function group for a socket API 308, referred to hereinafter. The NW-APP 304 and the Java (registered trademark)-VM 306 do not call a socket API (Application Programming Interface) provided by the OS, but call the socket API wrapper 307.

Upon receiving an API call from the NW-APP 304 or the Java (registered trademark)-VM 306, the socket API wrapper 307 calls an associated API of the socket API 308 according to the content of the received call. The socket API 308 is an API group for providing general socket functions, and is incorporated in the OS as standard equipment. A protocol stack 309 is responsible for communication function of IP protocols, and is incorporated in the OS as standard equipment.

A network driver A 310 is a device driver that controls the network interface-A 2010. A network driver B 311 is a device driver that controls the network interface-B 2011.

The above-mentioned software group ranging from the login application 301 to the network driver B 311 is generally stored in the HDD 2004, and each software program is loaded into the RAM 2002 as required, and is executed by the CPU 2001. Applications ranging from the login application 301 to the socket API wrapper 307 operate in the application space on the OS, while applications ranging from the socket API 308 to the network driver B 311 operate in the kernel space on the OS. It should be noted that the OS on which the software programs operate and software groups for realizing the other functions of the multifunction peripheral are also stored in the HDD 2004, and are each loaded into the RAM 2002 as required, for execution.

Next, a description will be given of operation processes executed by the MFP 101 for transmitting a multicast packet via both the network interface-A 2010 and the network interface-B 2011.

Figure 4:
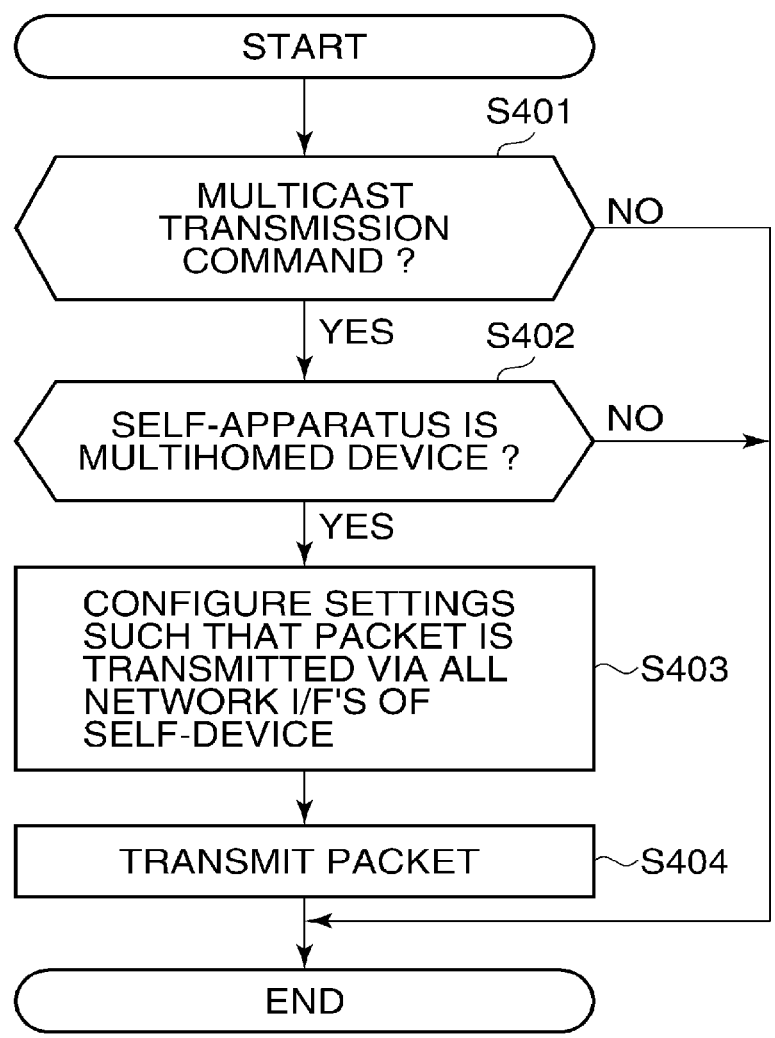
FIG. 4 is a flowchart of a network interface-configuring process executed by the MFP for multicast transmission.

FIG. 4 is a flowchart of a network interface-configuring process executed by the MFP 101, for multicast transmission.

Unless otherwise specified as settings concerning a user logged in or other conditions, whenever the NW-APP 304 or the Java (registered trademark)-APP 305 issues a multicast transmission request, the MFP 101 performs multicast transmission via all the network interfaces provided therein. That is, e.g. when a user is not registered by the login application 301 or when a network interface via which a multicast packet is to be transmitted is not set, the MFP 101 performs multicast transmission via all the network interfaces.

Referring to FIG. 4, in a step S401, the socket API wrapper 307 determines whether or not a processing command received when its own wrapper API is called is for multicast transmission. The socket API wrapper 307 represents wrappers of standard functions in C programming language, and the wrappers include the wrapper of the socket API as well. If a called API is an API for use in multicast transmission, such as sendto ( ) it is checked whether or not a destination IP address is a multicast address. In sendto ( ) the IP address is contained in the structure of the fifth argument. If the destination IP address is a multicast address, i.e. if the address assumes a value in a range between 224.0.0.0 and 239.255.255.255, it is determined that the command received from a higher-order application is a multicast transmission command (YES to the step S401). On the other hand, if the received command is not a multicast transmission command (NO to the step S401), the socket API wrapper 307 immediately transfers the processing command to the socket API 308 without modifying the content of the command.

FIG. 5 illustrates an example of data transmitted by the NW-APP 304 or the Java (registered trademark)-APP 305.

In the present embodiment, the NW-APP 304 and the Java (registered trademark)-APP 305 use the SLP (Service Location Protocol) to search for a service on the network. The NW-APP 304 and the Java (registered trademark)-APP 305 transmits data shown in FIG. 5. This means that the data shown in FIG. 5 is set as the second argument of sendto ( ) in the program code (C language) forming the NW-APP 304 or the Java (registered trademark)-APP 305. FIG. 5 shows an example of SLD data. It should be noted that although the data shown in FIG. 5 is divided into field units so as to visualize the contents of the data, the data is set as hexadecimal data in the actual program code.

Referring again to FIG. 4, if it is determined in the step S401 that the command received from the higher-order application is a multicast transmission command (YES to the step S401), the process proceeds to a step S402. In the step S402, the socket API wrapper 307 determines whether or not the self-apparatus (MFP 101 in the present example) where the socket API wrapper 307 operates is a multihomed device. A multihomed device means a device configured to enable simultaneous use of a plurality of network interfaces, as described hereinbefore.

In the step S402, the socket API wrapper 307 queries the OS to find currently active network interfaces of the MFP 101. If there are detected a plurality of active network interfaces, the socket API wrapper 307 determines that the self-apparatus (MFP 101 in the present example) is a multihomed device. On the other hand, if the MFP 101 is not a multihomed device (NO to the step S402), the socket API wrapper 307 immediately transfers the processing command to the socket API 308 without modifying the content of the command. In the present embodiment, the two network interfaces, i.e. the network interface-A 2010 and the network interface-B 2011, exist as active ones, and therefore, the MFP 101 is determined as a multihomed device.

Then, in a step S403, the socket API wrapper 307 sets a socket option such that the multicast packet can be sent to each of the currently active network interfaces. This processing is performed by designating IP_MULTICAST_IF as the third argument of setsockopt ( ). At the same time, the IP address of an interface desired for multicast transmission is set in the fourth argument. Therefore, the socket API wrapper 307 acquires an IP address associated with the network interface-A 2010 and sets the value of the acquired IP address in the fourth argument of setsockopt ( ) to execute the command. Then, the socket API wrapper 307 acquires an IP address associated with the network interface-B 2011 and sets the value of the acquired IP address in the fourth argument of setsockopt ( ) to execute the command. Thus, the command issued by the higher-order application in the step S401 for transmitting a multicast packet is registered in a protocol stack such that the packet is to be delivered to both the network interface-A 2010 and the network interface-B 2011.

Then, in a step S404, the socket API wrapper 307 executes transmission of the multicast packet using sendto ( ). In this case, the arguments set in sendto ( ) are the same as the contents called by the higher-order application in the step S401. In this timing, the multicast packet is transferred from the socket API wrapper 307 to the socket API 308, and is passed to the network driver A and the network driver B via the protocol stack 309. Thereafter, the multicast packet is transmitted from the network interface-A 2010 and the network interface-B 2011. Thus, the multicast packet can reach the MFP 111 and the MFP 112 existing on the LAN-A 110 and the MFP 121 and the MFP 122 existing on the LAN-B 120.

FIGS. 6 and 7 illustrate examples of the multicast packets transmitted via the network interface-A 2010 and the network interface-B 2011, respectively.

The multicast packets shown in FIGS. 6 and 7 are the SLP protocol packets transmitted in the step S401. The SLP protocol packets are distinguished from each other only by MAC addresses and IP addresses assigned to the network interface-A 2010 and the network interface-B 2011. Therefore, the packets are different from each other in sender MAC address and sender IP address, but identical in the other values. In both of the two packets, a destination MAC address and a destination IP address are multicast addresses. The SLP data is the same as that shown in FIG. 5.

Next, a description will be given of operation processes executed by the MFP 101 for transmitting a multicast packet via one or both of the network interface-A 2010 and the network interface-B 2011 depending on a user having logged in the MFP 101.

Figure 8A:
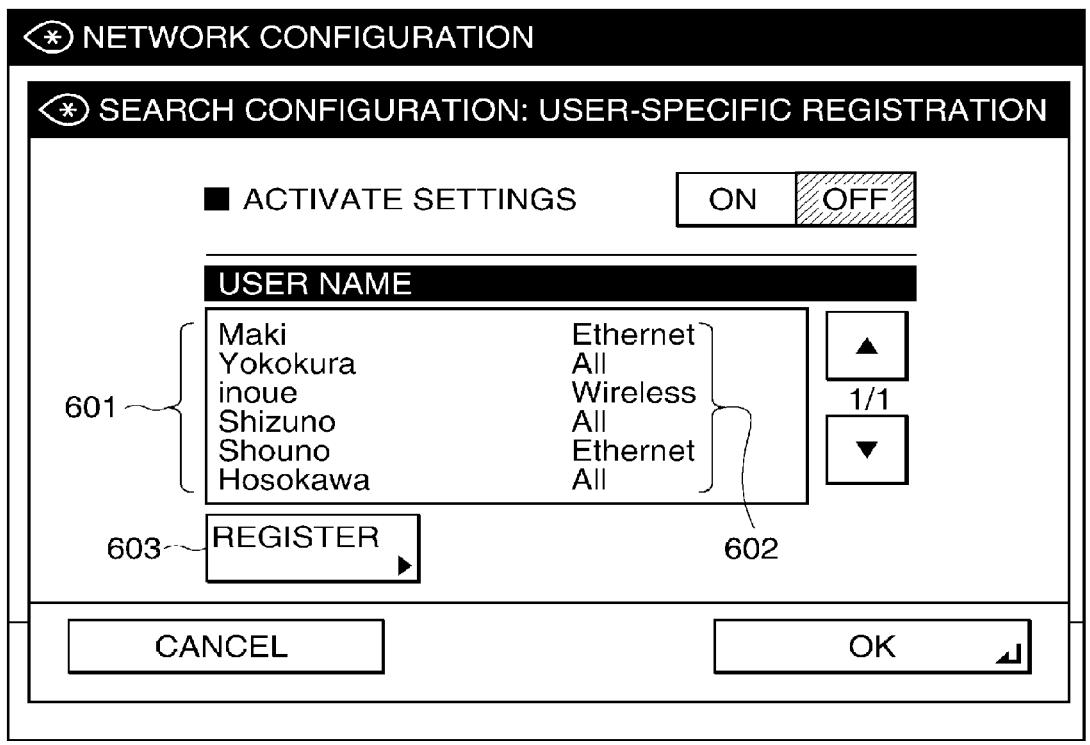
FIG. 8A is a view of a screen displayed on an operation unit during configuration of network interfaces, for associating user names and network interfaces.
Figure 8B:
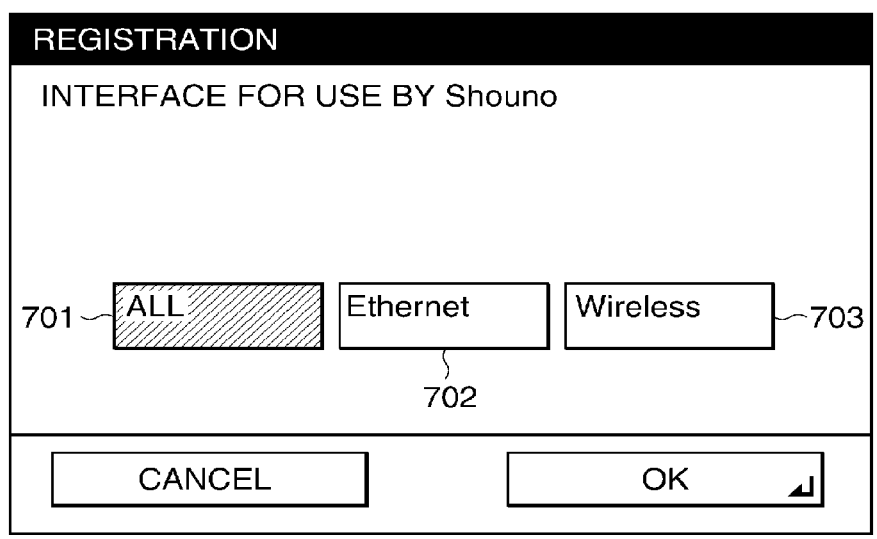
FIG. 8B is a view of a screen displayed on the operation unit during configuration of network interfaces, for changing the configuration of a network interface associated with a user name.

First, screens for associating a user name registered in association with a user of the MFP 101 and a network interface to be used for multicast packet transmission are shown in FIGS. 8A and 8B.

FIG. 8A illustrates an example of a display screen for associating user names registered in association with users of the MFP 101, respectively, and network interfaces to be used for multicast packet transmission. The screen (dialog) shown in FIG. 8A is displayed on the operation unit 2012 for use by a user of the MFP 101.

Referring to FIG. 8A, user names registered in the MFP 101 are displayed in a list 601 in an enumerated manner. Information on settings of network interfaces registered in association with respective users as ones from each of which a multicast packet is to be transmitted is displayed in a list 602. For example, a network interface associated with a user name "Maki" is "Ethernet (registered trademark)". This means that when the user "Maki" has logged into the MFP 101, the MFP 101 transmits a multicast packet only from the network interface-A 2010 implemented by the Ethernet (registered trademark).

Further, a network interface associated with a user name "Yokokura" is "All". This means that when the user "Yokokura" has logged into the MFP 101, the MFP 101 delivers a multicast packet to all the network interfaces. More specifically, the multicast packet is delivered to both the network interface-A 2010 and the network interface-B 2011.

Furthermore, a network interface associated with a user name "Inoue" is "Wireless". This means that when the user "Inoue" has logged into the MFP 101, the MFP 101 transmits a multicast packet only from the network interface-B 2011 implemented by the wireless LAN.

A button 603 is used to switch the display screen to a screen for changing the setting of a network interface associated with each user for use in transmission of a multicast packet. When a desired user is designated in the list 601 by the operator and an input by the button 603 is detected, the MFP 101 switches the display screen to a screen shown in FIG. 8B.

FIG. 8B illustrates an example of the display screen for changing the setting of a network interface associated with a user for use in transmission of a multicast packet.

The screen (dialog) shown in FIG. 8B is displayed when a network interface associated with a user "Shouno" is designated. A button 701 is used to designate all the network interfaces of the MFP 101, i.e. the network interface-A 2010 and the network interface-B 2011. A button 702 is used to designate the Ethernet (registered trademark) interface of the MFP 101, i.e. the network interface-A 2010. A button 703 is used to designate the wireless LAN interface of the MFP 101, i.e. the network interface-A I/F-B 2011.

When one of the buttons 701 to 703 is selected by the operator and an input by an OK button 704 is detected, the network interface associated with the user "Shouno" is registered. Then, the registered information (network interface configuration information) is stored in the configuration DB 303, as a transmission condition for transmitting a multicast packet and a broadcast packet via a predetermined network interface.

FIG. 9 is a flowchart of a network interface-configuring process executed by the MFP 101 for multicast transmission depending on a user logged in. It is assumed that a network interface associated with the user logged into the MFP 101 has been registered in advance by the above-described method.

Referring to FIG. 9, in a step S501, the socket API wrapper 307 determines whether or not a processing command received when its own wrapper API is called is for multicast transmission. If the called API is an API for use in multicast transmission, such as sendto ( ), it is checked whether or not a destination IP address is a multicast address. In sendto ( ), the destination IP address is contained in the structure of the fifth argument. If the destination IP address is a multicast address, i.e. if the address assumes a value within a range between 224.0.0.0 and 239.255.255.255, it is determined that the command received from a higher-order application is a multicast transmission command (YES to the step S501). On the other hand, if the received command is not a multicast transmission command (NO to the step S501), the socket API wrapper 307 immediately transfers the processing command to the socket API 308 without modifying the content of the command.

If it is determined in the step S501 that the command received from the higher-order application is a multicast transmission command (YES to the step S501), the process proceeds to a step S502. In the step S502, the socket API wrapper 307 determines whether or not the self-apparatus (MFP 101 in the present example) where the socket API wrapper 307 operates is a multihomed device.

In the step S502, the socket API wrapper 307 queries the OS to find currently active network interfaces of the MFP 101. If there are detected a plurality of active network interfaces, the socket API wrapper 307 determines that the self-apparatus (MFP 101 in the present example) is a multihomed device. On the other hand, if the MFP 101 is not a multihomed device (NO to the step S502), the socket API wrapper 307 immediately transfers the processing command to the socket API 308 without modifying the content of the command. In the present embodiment, the two network interfaces, i.e. the network interface-A 2010 and the network interface-B 2011, exist as active ones, and therefore, the MFP 101 is determined as a multihomed device.

Then, in a step S503, the socket API wrapper 307 refers to the network interface configuration information registered on a user-by-user basis by the method described with reference to FIGS. 8A and 8B, and checks a network interface configuration associated with the currently logged-in user. Specifically, the socket API wrapper 307 queries the login application 301 as to the identification information of the user having currently logged into the MFP 101. Then, the socket API wrapper 307 refers to the network interface configuration information stored in the configuration DB 303 and acquires the configuration information on the network interface associated with the user having currently logged into the MFP 10 for use in transmission of a multicast packet. Thus, when an operation of the user having currently logged into the MFP 101 gives a trigger to transmit a multicast packet, it is possible to acquire the network interface information of a network interface via which the multicast packet is to be transmitted.

Then, in a step S504, the socket API wrapper 307 sets a socket option such that the multicast packet can be sent to the network interface designated in the network interface configuration information acquired in the step S503. This processing is performed by designating IP_MULTICAST_IF as the third argument of setsockopt ( ). At the same time, the IP address of an interface desired for multicast transmission is set in the fourth argument. The socket API wrapper 307 acquires an IP address associated with the network interface designated for transmission of the multicast packet from the configuration information acquired in the step S503, and sets the value of the acquired IP address in the fourth argument of setsockopt ( ) to execute the command.

Then, in a step S505, the socket API wrapper 307 transmits the multicast packet using sendto ( ). In this case, the arguments set in sendto ( ) are the same as the contents called by the higher-order application in the step S501. In this timing, the multicast packet is transferred from the socket API wrapper 307 to the socket API 308, and is passed to the network interface designated for transmission of the multicast packet, via the protocol stack 309. Thereafter, the multicast packet is transmitted from the network interface designated for transmission of the multicast packet. Thus, the multicast packet can reach devices on a LAN to which is connected the network interface designated for transmission of the multicast packet in association with the user having currently logged into the MFP 101. Although the above description is given of a case where multicasting is performed, the same processing is executed for broadcasting.

Although in the above-described embodiment, the process shown in FIG. 4 and the process shown in FIG. 9 are described separately, this is not limitative, but for example, the processes may be configured such that after execution of the step S502 in FIG. 9, the socket API wrapper 307 may determine whether or not the operator of the MFP 101 has logged in, and if the operator has not logged in, the steps S403 et seq. in FIG. 4 may be executed, whereas if the operator has logged in, the steps S503 et seq. in FIG. 9 may be executed.

Alternatively, the socket API wrapper 307 may determine after execution of the step S502 in FIG. 9 whether or not the operator of the MFP 101 is an unregistered user. In this case, if the operator is an unregistered user, the socket API wrapper 307 may cause an image to be displayed so as to prompt the operator to perform registration. Further, a network interface to be used for packet transmission may be selected according to a user operation, or the steps S403 et seq. may be executed.

According to the above-described first embodiment, it is possible to enable a communication apparatus configured as a multihomed device to perform multicasting or broadcasting using a user-desired network interface, without developing an application incorporating a dedicated code. Further, even in a case where an application developed with an intention to operate for a single network interface is operated on a multihomed device, it is possible to prevent a multicast or broadcast packet from being delivered to an unintended network interface.

Further, it is possible to change a network interface via which a multicast or broadcast packet is to be transmitted, according to the rights of an operator of a multihomed device, to thereby prevent the packet from being sent to a network undesirable from the viewpoint of access rights and security.

Next, a second embodiment of the present invention will be described. An MFP which is an image forming apparatus as a communication apparatus according to the second embodiment is identical in configuration to the MFP 101 in the first embodiment, which is described hereinabove with reference to FIGS. 1 to 3. Therefore, component elements corresponding to those in the first embodiment are denoted by identical reference numerals, and description thereof is omitted.

The second embodiment is distinguished from the first embodiment in that a network interface via which a multicast packet is to be transmitted is determined not based on a user name as described above in the first embodiment, but based on a multicast destination address.

FIG. 10 is a view of an example of a configuration screen for associating an IP address as a destination to which a multicast packet is to be transmitted by the MFP 101 which is the image forming apparatus as the communication apparatus according to the second embodiment and a network interface via which the multicast packet is to be transmitted.

The screen shown in FIG. 10 is displayed on the operation unit 2012 of the MFP 101 and is operated by the operator of the MFP 101. Reference numeral 801 denotes an entry box for allowing the operator to input a multicast address as a destination to which a multicast packet is to be transmitted. Reference numeral 802 denotes a button for designating "Ethernet (registered trademark)" for a network interface via which the multicast packet is to be transmitted to the multicast address designated in the entry box 801. Reference numeral 808 denotes a button for designating "Wireless" for the network interface via which the multicast packet is to be transmitted to the multicast address designated in the entry box 801.

In short, the entry box 801 and the buttons 802 and 803 are operated by the operator of the MFP 101 so as to designate a transmission source network interface associated with a multicast address. It should be noted that information (network interface configuration information) configured by the operator is stored in the configuration DB 303, as transmission conditions for transmitting a multicast packet and a broadcast packet via a predetermined network interface.

Next, with reference to FIG. 11, a description will be given of a network interface-configuring process executed by the MFP 101 based on the configuration information set by the method described with reference to FIG. 10, for multicast transmission.

Figure 11:
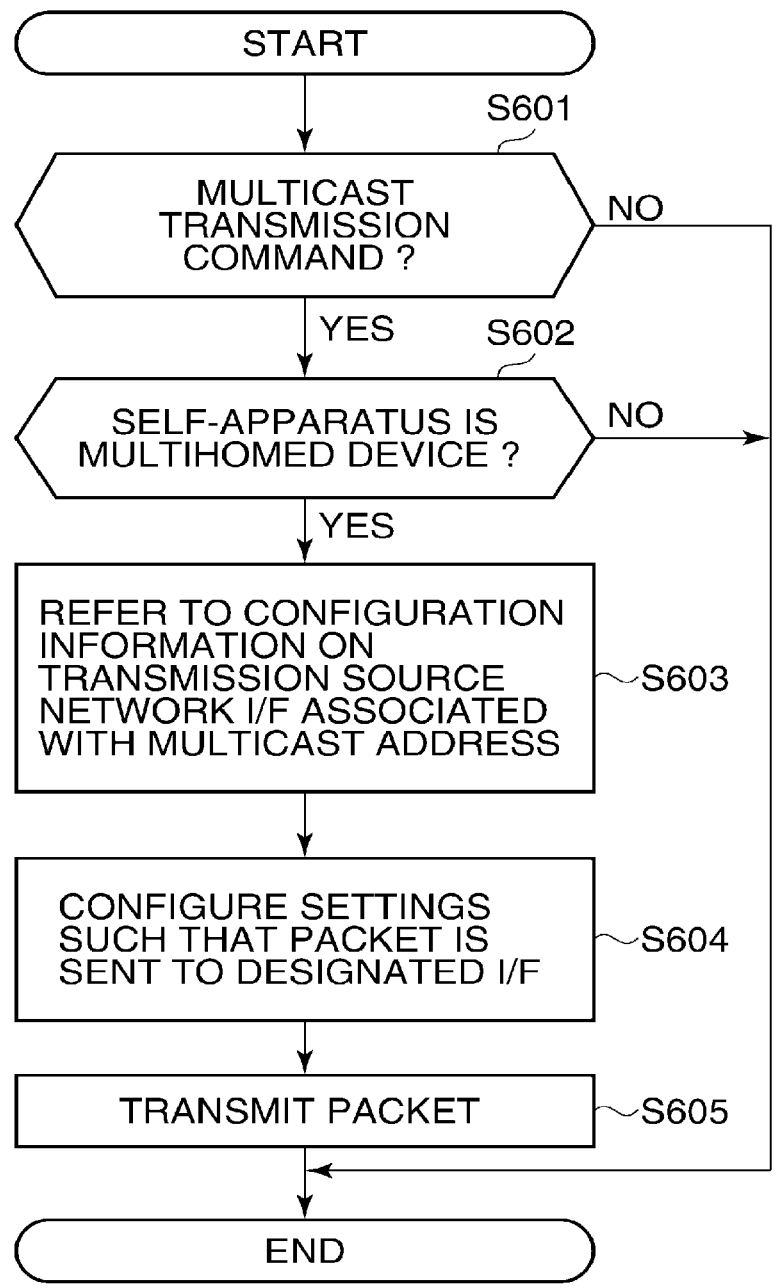
FIG. 11 is a flowchart of a network interface-configuring process executed by the MFP which is the image forming apparatus as the communication apparatus according to the second embodiment, for multicast transmission.

FIG. 11 is a flowchart of the network interface-configuring process executed by the MFP 101 which is the image forming apparatus as the communication apparatus according to the second embodiment, for multicast transmission. It should be noted that the steps S601 and S602 in FIG. 11 are the same as the steps S501 and S502 in FIG. 9, and therefore description thereof is omitted.

Referring to FIG. 11, in a step S603, the socket API wrapper 307 refers to the network interface configuration information stored in the configuration DB 303 and checks a transmission source network interface configuration associated with the multicast address. Specifically, the socket API wrapper 307 queries the configuration DB 303 to obtain the transmission source network interface configuration information associated with the multicast address designated by the NW-APP 304 or the Java (registered trademark)-APP 305. This information is configured on the screen shown in FIG. 10 by the operator of the MFP 101. More specifically, in the information, one of (1) Ethernet (registered trademark) (network interface-A 2010), (2) Wireless LAN (network interface-B 2011), and (3) Both Ethernet and Wireless LAN is associated with each multicast address.

Then, in a step S604, the socket API wrapper 307 sets a socket option such that the multicast packet can be sent to the network interface designated in the network interface configuration information acquired in the step S603. This processing is performed by designating IP_MULTICAST_IF as the third argument of setsockopt ( ). At the same time, the IP address of an interface desired for multicast transmission is set in the fourth argument. Thus, the socket API wrapper 307 acquires an IP address associated with a network interface designated in the network interface configuration information acquired in the step S603 for transmission of a multicast packet, and sets the value of the acquired IP address in the fourth argument of setsockopt ( ) to execute the command.

Then, in a step S605, the socket API wrapper 307 transmits the multicast packet using sendto ( ). In this case, the arguments set in sendto ( ) are the same as the contents called by the higher-order application in the step S501 in FIG. 9. In this timing, the multicast packet is transferred from the socket API wrapper 307 to the socket API 308, and is passed to the network interface designated for transmission of the multicast packet, via the protocol stack 309. Thereafter, the multicast packet is transmitted from the network interface designated for transmission of the multicast packet.

According to the above-described second embodiment, it is possible to provide the same advantageous effects as provided by the first embodiment. Further, a multicast packet can be transmitted via a network interface designated for transmission of the multicast packet according to a multicast destination address set by a user, which makes it possible to improve userfriendliness.

Next, a third embodiment of the present invention will be described. An MFP which is an image forming apparatus as a communication apparatus according to the third embodiment is identical in configuration to the MFP 101 in the first embodiment, which is described hereinabove with reference to FIGS. 1 to 3. Therefore, component elements corresponding to those in the first embodiment are denoted by identical reference numerals, and description thereof is omitted.

The third embodiment is distinguished from the first embodiment in that a network interface via which a multicast packet is to be transmitted is determined not based on a user name as described above in the first embodiment, but based on a port number of a UDP packet.

Figure 12:
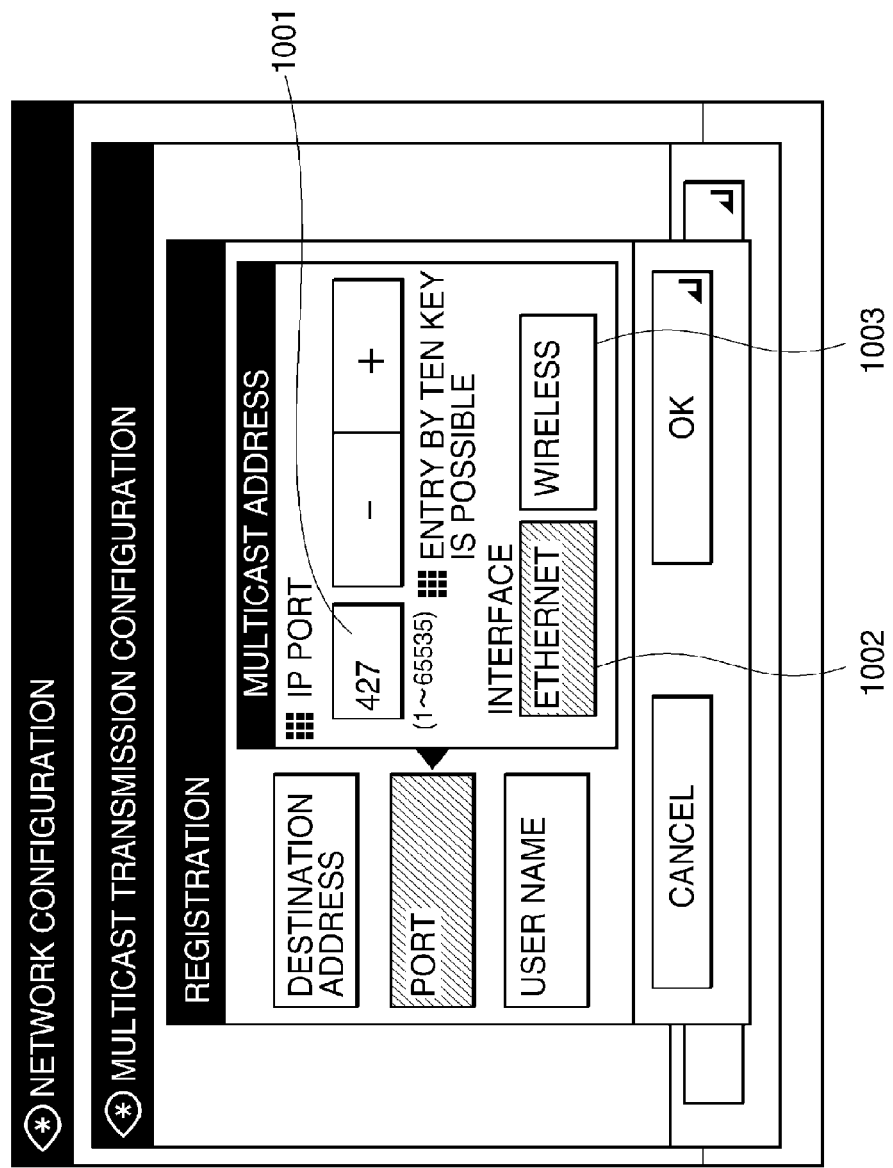
FIG. 12 is a view of an example of a configuration screen displayed on an operation unit of an MFP which is an image forming apparatus as a communication apparatus according to a third embodiment of the present invention, for associating a port number of a multicast packet to be transmitted from the MFP and a network interface via which the packet is to be transmitted.

FIG. 12 is a view of an example of a configuration screen displayed for associating a port number of a multicast packet to be transmitted by the MFP 101 which is the image forming apparatus as the communication apparatus according to the third embodiment and a network interface via which the packet is to be transmitted.

The screen shown in FIG. 12 is displayed on the operation unit 2012 of the MFP 101 and is operated by the operator of the MFP 101. Reference numeral 1001 denotes an entry box for allowing the operator to input a port number of a destination to which a multicast packet is to be transmitted. A reference numeral 1002 denotes a button for designating "Ethernet (registered trademark)" for a network interface associated with the port number designated in the entry box 1001. A reference numeral 1003 denotes a button for designating "Wireless" for the network interface associated with the port number designated in the entry box 1001. In short, the entry box 1001 and the buttons 1002 and 1003 are operated by the operator of the MFP 101 so as to designate a transmission source network interface associated with a multicast address. It should be noted that information (network interface configuration information) configured by the operator is stored in the configuration DB 303, as transmission conditions for transmitting a multicast packet and a broadcast packet via a predetermined network interface.

Next, with reference to FIG. 12, a description will be given of a network interface-configuring process executed by the MFP 101 based on the configuration information set by the method described with reference to FIG. 12, for multicast packet transmission.

Figure 13:
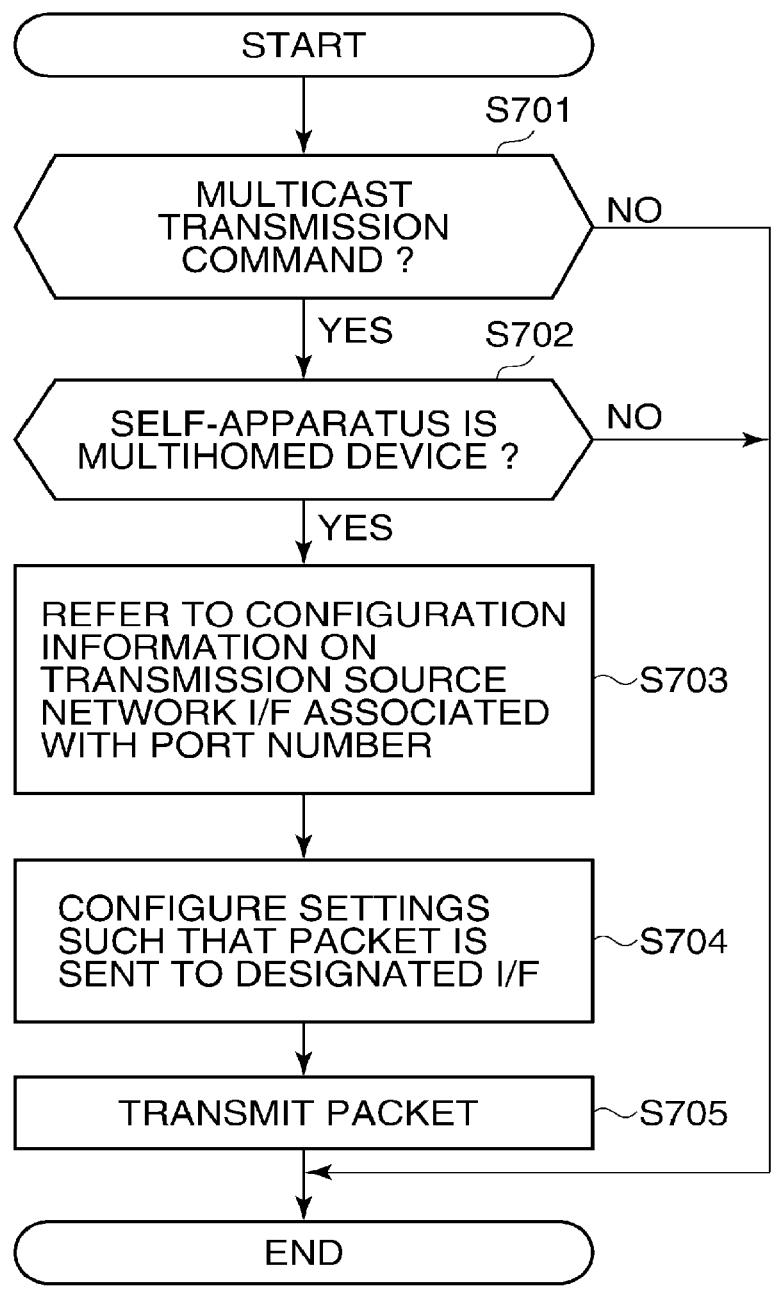
FIG. 13 is a flowchart of a network interface-configuring process executed by the MFP which is the image forming apparatus as the communication apparatus according to the third embodiment, for multicast transmission.

FIG. 13 is a flowchart of the network interface-configuring process executed by the MFP 101 which is the image forming apparatus as communication apparatus according to the third embodiment, for multicast transmission. It should be noted that steps S701 and S702 in FIG. 13 are the same as the steps S501 and S502 in FIG. 9, and therefore description thereof is omitted.

Referring to FIG. 13, in a step S703, the socket API wrapper 307 refers to the network interface configuration information stored in the configuration DB 303 and checks a transmission source network interface configuration associated with a port number. Specifically, the socket API wrapper 307 queries the configuration DB 303 to obtain transmission source network interface information associated with the port number designated by the NW-APP 304 or the Java (registered trademark)-APP 305. This information is configured on the screen shown in FIG. 12 by the operator of the MFP 101. More specifically, in the information, one of (1) Ethernet (registered trademark) (network interface-A 2010), (2) Wireless LAN (network interface-B 2011), and (3) Both Ethernet and Wireless LAN is associated with each port number.

Then, in a step S704, the socket API wrapper 307 sets a socket option such that the multicast packet can be sent to the network interface designated in the network interface configuration information acquired in the step S703. This processing is performed by designating IP_MULTICAST_IF as the third argument of setsockopt ( ). At the same time, the IP address of an interface desired for multicast transmission is set in the fourth argument. Thus, the socket API wrapper 307 acquires an IP address associated with the network interface designated in the network interface configuration information acquired in the step S703, for transmission of the multicast packet, and sets the value of the acquired IP address in the fourth argument of setsockopt ( ) to execute the command.

Then, in a step S705, the socket API wrapper 307 transmits the multicast packet using sendto ( ). In this case, the arguments set in sendto ( ) are the same as the contents called by the higher-order application in the step S501 in FIG. 9. In this timing, the multicast packet is transferred from the socket API wrapper 307 to the socket API 308, and is passed to the network interface designated for transmission of the multicast packet, via the protocol stack 309. Thereafter, the multicast packet is transmitted from the network interface designated for transmission of the multicast packet.

According to the above-described third embodiment, it is possible to provide the same advantageous effects as provided by the first embodiment. Further, a multicast packet can be transmitted via a network interface designated for transmission of the multicast packet according to a port number of a UDP packet, which makes it possible to improve userfriendliness.

Although in the first to third embodiments, the present invention is applied to the MFP 101 as an image forming apparatus as the communication apparatus, this is not limitative, but it is to be understood that the present invention can be applied to information processing apparatuses, terminal units, etc. which have a communication capability.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-230594, filed Oct. 2, 2009, which is hereby incorporated by reference herein in its entirety.

What is claimed is:

1. A communication apparatus having an application, comprising:
    a transmitting unit configured to perform transmission;
    a receiving unit configured to receive a transmission request from the application;
    a determining unit configured to determine, in the case where the receiving unit receives the transmission request from the application, whether or not the communication apparatus is multihomed with a plurality of active network interfaces; and
    a controlling unit configured to control, in the case where the determining unit determines that the communication apparatus is multihomed with the plurality of active network interfaces, the transmitting unit to perform transmission using the plurality of active network interfaces.

2. The communication apparatus according to claim 1,
    wherein in the case where the determining unit does not determine that the communication apparatus is multihomed with the plurality of active network interfaces, the controlling unit is configured to control the transmitting unit to perform transmission without modifying contents of the transmission request received from the application.

3. The communication apparatus according to claim 1,
    wherein the transmission request is a request for instructing transmission of a multicast packet, and
    wherein the transmitting unit is configured to perform transmission of the multicast packet based on the transmission request.

4. A method of controlling a communication apparatus having an application, the method comprising:
    receiving a transmission request from the application;
    determining, in the case where the receiving step receives the transmission request from the application, whether or not the communication apparatus is multihomed with a plurality of active network interfaces; and
    controlling, in the case where the determining step determines that the communication apparatus is multihomed with the plurality of active network interfaces, transmitting using the plurality of active network interfaces.

5. A non-transitory computer-readable storage medium that, when executed by a computer, causes the computer to perform a method of controlling a communication apparatus having an application, the method comprising:
   receiving a transmission request from the application;
   determining, in the case where the receiving step receives the transmission request from the application, whether or not the communication apparatus is multihomed with a plurality of active network interfaces; and
   controlling, in the case where the determining step determines that the communication apparatus is multihomed with the plurality of active network interfaces, transmitting using the plurality of active network interfaces.

\* \* \* \* \*